United States Patent
Jiang et al.

(10) Patent No.: US 9,930,329 B2
(45) Date of Patent: Mar. 27, 2018

(54) VIDEO ENCODING AND DECODING BASED ON IMAGE REFINEMENT

(75) Inventors: Wenfei Jiang, Wuhan (CN); Fan Zhang, Wuhan (CN); Zhibo Chen, Beijing (CN)

(73) Assignee: THOMSON Licensing, Issy-les-Moulineaux (FR)

( * ) Notice: Subject to any disclaimer, the term of this patent is extended or adjusted under 35 U.S.C. 154(b) by 368 days.

(21) Appl. No.: 14/353,811

(22) PCT Filed: Nov. 3, 2011

(86) PCT No.: PCT/CN2011/081744
§ 371 (c)(1),
(2), (4) Date: Apr. 24, 2014

(87) PCT Pub. No.: WO2013/063784
PCT Pub. Date: May 10, 2013

(65) Prior Publication Data
US 2014/0254676 A1    Sep. 11, 2014

(51) Int. Cl.
*H04N 19/136*    (2014.01)
*H04N 19/176*    (2014.01)
(Continued)

(52) U.S. Cl.
CPC ..... *H04N 19/00139* (2013.01); *H04N 19/103* (2014.11); *H04N 19/117* (2014.11);
(Continued)

(58) Field of Classification Search
CPC . H04N 7/12; H04N 9/18; H04N 9/117; H04N 9/136; H04N 9/82; H04N 7/24; G06K 9/36; G06K 9/00
See application file for complete search history.

(56) References Cited

U.S. PATENT DOCUMENTS

| 6,101,279 A | 8/2000 | Nguyen et al. |
| 2003/0138150 A1 | 7/2003 | Srinivasan |

(Continued)

FOREIGN PATENT DOCUMENTS

| CN | 101267562 | 9/2008 |
| CN | 101488219 | 7/2009 |

(Continued)

OTHER PUBLICATIONS

Bronstein: "Lazy Sliding Window Implementation of the Bilateral Filter on Parallel Architectures". IEEE Transaction on Image Processing, vol. 20, No. 6, Jun. 2011, pp. 1751-1756.

(Continued)

*Primary Examiner* — Sathyanaraya V Perungavoor
*Assistant Examiner* — Patricia I Young
(74) *Attorney, Agent, or Firm* — Brian J. Dorini; Xiaoan Lu (57) ABSTRACT

A particular implementation forms an initial reconstructed image block from inverse quantization and inverse transform, and further refines the reconstructed image block using pixels from neighboring reconstructed blocks. The image block may be refined using a bilateral filter, whose space parameter and range parameter are adaptive to the quantization parameter. The particular implementation can be used in both encoding and decoding when reconstructing an image block. When used in encoding, the particular implementation can be used jointly with coefficient truncation, where some non-zero transform coefficients are set to zero. The number of remaining non-zero transform coefficients after coefficient truncation may be adaptive to the quantization parameter, the variance of the image block, the number of non-zero transform coefficients of the image block, and the index of the last non-zero transform coefficient in a zigzag scanning order.

14 Claims, 6 Drawing Sheets

(51) Int. Cl.
*H04N 19/147* (2014.01)
*H04N 19/103* (2014.01)
*H04N 19/117* (2014.01)
*H04N 19/132* (2014.01)
*H04N 19/14* (2014.01)
*H04N 19/82* (2014.01)
*H04N 19/124* (2014.01)
*H04N 19/192* (2014.01)
*H04N 19/86* (2014.01)

(52) U.S. Cl.
CPC ......... *H04N 19/124* (2014.11); *H04N 19/132* (2014.11); *H04N 19/14* (2014.11); *H04N 19/147* (2014.11); *H04N 19/176* (2014.11); *H04N 19/192* (2014.11); *H04N 19/82* (2014.11); *H04N 19/86* (2014.11)

(56) References Cited

U.S. PATENT DOCUMENTS

| | | |
|---|---|---|
| 2006/0018558 A1 | 1/2006 | Kuniba |
| 2008/0152014 A1 | 6/2008 | Schreier et al. |
| 2008/0225951 A1 | 9/2008 | Young et al. |
| 2011/0021063 A1 | 1/2011 | Tsai et al. |
| 2011/0032983 A1 | 2/2011 | Sezer |
| 2012/0044989 A1* | 2/2012 | Ahuja .................. H04N 19/117 375/240.03 |
| 2013/0114690 A1 | 5/2013 | Chono et al. |

FOREIGN PATENT DOCUMENTS

| | | |
|---|---|---|
| CN | 101964881 | 2/2011 |
| CN | 102164366 | 8/2011 |
| KR | 20070110635 | 11/2007 |
| WO | WO2010091504 | 8/2010 |
| WO | WO2011064944 | 6/2011 |

OTHER PUBLICATIONS

Fu, et al., "Sample Adaptive Offset with LCU-based Syntax", Joint Collaborative Team on Video Coding (JCT-VC) of ITI-T SG16 WP3 and ISO/IEC JTC1/SC29/WG11, Document: JCTVC-F056, 6th Meeting: Torino, IT, Jul. 14-22, 2011.

* cited by examiner

VIDEO ENCODING AND DECODING BASED ON IMAGE REFINEMENT

This application claims the benefit, under 35 U.S.C. § 365 of International Application PCT/CN2011/081744 filed Nov. 3, 2011 which was published in accordance with PCT Article 21(2) on May 10, 2013 in English.

TECHNICAL FIELD

This invention relates to video encoding and decoding, and more particularly, to video encoding and decoding using image refinement.

BACKGROUND

To achieve high compression efficiency, image and video coding schemes usually employ prediction and transform to leverage the spatial and temporal redundancy in the video. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data is decoded by inverse processes corresponding to the prediction, transform, quantization, and entropy coding.

SUMMARY

According to a general aspect, during encoding and decoding, an image block is first reconstructed using inverse quantization and inverse transform. The reconstructed image block is then refined using pixels of neighboring reconstructed blocks.

According to another general aspect, during encoding and decoding, an image block is first reconstructed using inverse quantization and inverse transform. The reconstructed image block is then refined by a bilateral filter using pixels of neighboring reconstructed blocks. The space parameter and the range parameter of the bilateral filter are adaptive to the quantization parameter.

According to another general aspect, the transform coefficients are truncated so that the number of remaining non-zero transform coefficients is adaptive to the quantization parameter, the variance of the image block, the number of non-zero coefficients, and/or the index of the last non-zero coefficient in a scanning order. In addition, during reconstruction, an image block is first reconstructed using inverse quantization and inverse transform, then the reconstructed image block is refined using pixels of neighboring reconstructed blocks.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Compressed data are often regarded as random data, assuming little or no inherent image property can be further exploited during the decoding process. That is, the image is reconstructed using information that is explicitly or implicitly encoded in the compressed data.

However, certain prior knowledge about the video can be utilized at the decoder to enhance the decoded video quality. For example, a deblocking filter may be applied to remove strong blockiness since most images are known to have smooth content.

In another example, based on the prior knowledge that video signals may be sparsely represented, a commonly owned PCT application No. PCT/US11/000064, entitled "Video coding using compressive sensing," proposes to use compressive sensing in video compression. Compressive sensing is a technique to represent signals with a small number of measurements, and it may efficiently represent a large variety of signals below the Nyquist sampling rate. Using the prior knowledge that the differences between adjacent pixels are generally small in natural images, and thus the gradients are sparse, a compressive sensing mode is developed to reconstruct a block with a subset of transform coefficients.

The present embodiments provide a method and apparatus that employ image refinement to improve video compression efficiency. Common image properties, such as smoothness and singularity, may be used in designing image refinement tools. Singularity refers to the image property that there may exist edges and textures (i.e., the gray scale values of adjacent pixels may vary significantly) in an image. A good image refinement tool should preserve the singularity of images while considering the smoothness.

Figure 1A:
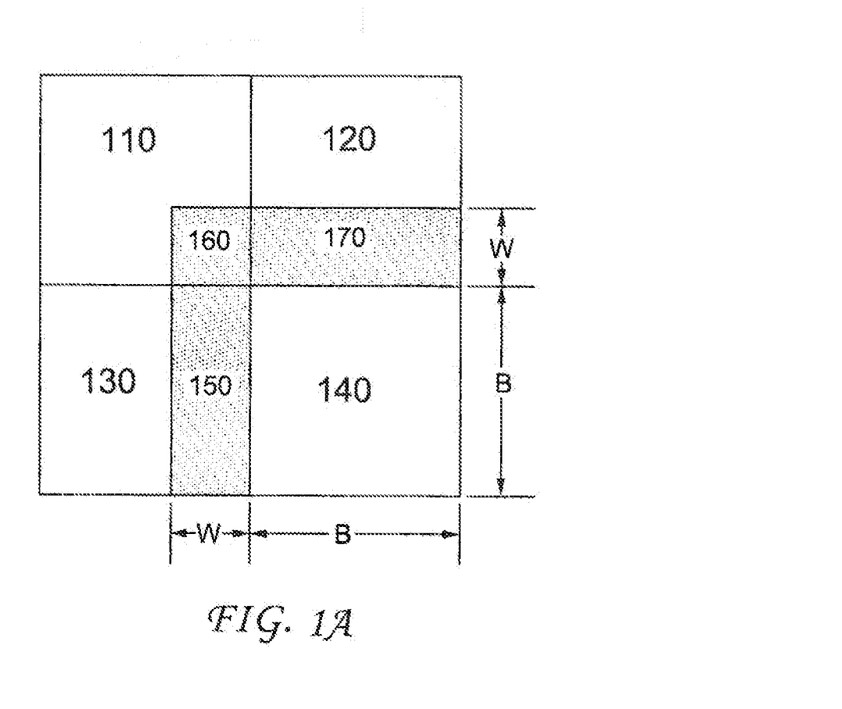
FIG. 1A is a pictorial example depicting how an image block may be refined using neighboring blocks.

FIG. 1A illustrates an example of using image characteristics to refine a current block, wherein image block 140 is the current block to be encoded, or decoded, and image blocks 110, 120, and 130 are already encoded, or decoded. Image block 140 may be initially reconstructed with existing methods. For example, it may be reconstructed through de-quantization, inverse transform according to the H.264 standard.

Using the previously coded neighboring blocks (110, 120, 130), the initial reconstructed block (140) may be refined. In one embodiment, the shaded areas 150, 160, and 170 may be used to refine image block 140. The shaded areas are adjacent to the current block and they are part of the previously coded neighboring blocks. We denote the block formed by the current block (140) and the shaded areas (150, 160, 170) as an extended block (180), wherein the current block (140) has B×B pixels, and the extended block (180) has m×m (m=B+W) pixels. In a more general example, a current block having $B_v \times B_h$ pixels may be extended to a $(B_v+W_v) \times (B_h+W_h)$ block. That is, the width ($B_h$) and height ($B_v$) of the current block may be different, and the extended lengths in the horizontal and vertical directions ($W_h$ and $W_v$ respectively) may also be different.

In the example of FIG. 1A, pixels from upper and left blocks are used to form the extended block. This is because most existing video compression standards encode image blocks in a raster scanning order and the upper and left blocks are encoded or decoded before the current block. Consequently, those blocks can be reconstructed at both the encoder and decoder in the same manner. When different coding orders are used, blocks from other locations, for example, right blocks and lower blocks, may be chosen to refine the current block.

The block size ($B_v \times B_h$) may vary based on the encoding configurations (resolutions, bit rate, etc). It may also vary from block to block within a frame. For example, it may be chosen to be 4×4, 8×8, 16×16, 8×4, or 4×8, or it may be chosen to have the same size as the transforms or quantization.

The extended block (180) may be viewed as an image block corrupted with noise because of compression, and thus its quality may be refined by image enhancement techniques. With the extended areas, the boundary pixels in the current block (140) may benefit from a region of filter support as large as other pixels inside the block.

De-noising filters or other image processing methods may be used to refine the extended block, for example, but not limited to, a median filter, a bilateral filter, or an SA-DCT (Shape Adaptive DCT) method may be used. The filter length may be chosen based on the computational complexity and the performance, and the size of the extended areas may be designed to adapt to the filter length, for example, W=(filter length−1)/2.

Figure 1B:
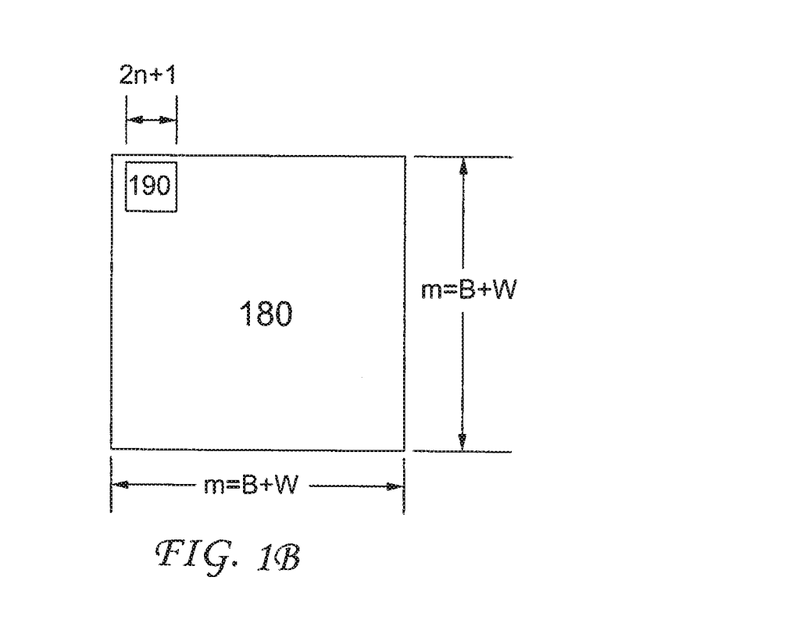
FIG. 1B is a pictorial example depicting how a filter may be applied using a sliding window, in accordance with an embodiment of the present principles.

Referring to FIG. 1B, an example of image refinement using a sliding window filtering is illustrated. In one embodiment, for the extended block (180), a bilateral filter is employed to process the pixels within a sliding window (190). We denote the size of the sliding window as (2n+1)× (2n−1), then the filtering process for a center pixel I(x, y) of the sliding window proceeds as follows:

Step 1: Calculate a closeness parameter for each pixel I(i, j) in the sliding window:

$$G(i,j) = e^{-[(x-i)^2+(y-j)^2]/(2\sigma_d^2)}, |i-x| \le n, |j-y| \le n,$$

where $\sigma_d$ is a space parameter.

Step 2: Calculate a similarity parameter for each pixel I(i, j) in the sliding window:

$$H(i,j) = e^{-[I(x,y)-I(i,j)]^2/(2\sigma_r^2)}, |i-x| \le n, |j-y| \le n,$$

where $\sigma_r$ is a range parameter and I(x,y) is the pixel value.

Step 3: Calculate the filter coefficient for each pixel I(i, j) in the sliding window:

$$F(i,j) = \frac{G(i,j)H(i,j)}{\sum_{p,q} G(p,q)H(p,q)}, |p-x| \le n, |q-y| \le n, p \le m, q \le m.$$

Step 4: Calculate the filtered result for pixel I(x,y):

$$I'(x,y) = \sum_{p,q} F(p,q)I(p,q), |p-x| \le n, |q-y| \le n, p \le m, p \le m.$$

After pixel I(x, y) is filtered, the sliding window moves to the next location to continue the filtering process. When the filtering is completed, filtered results are obtained for pixel locations corresponding to the current block and shaded areas. Note that while we update pixels within the current block with filtered results, we keep pixels for the shaded areas unchanged.

The filter can be applied iteratively. That is, after the current block is filtered, a new extended block may be formed and the filtered block can be filtered again. The number of iterations may be chosen to balance the performance gain and the computational complexity.

In one embodiment, B=8, W=n=2, and the parameters for the bilateral filter ($\sigma_d$ and $\sigma_r$) are adaptively calculated based on the quantization parameter (QP):

$$\sigma_d = \frac{QP}{60} + 1.77, \sigma_r = \frac{7QP^2 - 150QP + 810}{10^5}.$$

The calculation in the above equation is particularly appropriate for H.264. When the video sequence is compressed by other standards, the equation should be tuned accordingly.

As illustrated in FIGS. 1A and 1B, an initial reconstructed image block can be refined. A new coding mode, namely a collaborative coding mode, is defined to refer to this new coding method that uses an extended block to refine the current block.

Given the image refinement in the collaborative coding mode, it may be possible to send fewer transform coefficients to maintain the video quality, for example, using coefficient truncation or coefficient thresholding that discards some non-zero transform coefficients (i.e., sets some non-zero transform coefficients to zero).

When coefficient truncation is applied, fewer non-zero transform coefficients need to be entropy encoded and the bit rate is reduced. Of course, the information represented by the discarded transform coefficients is also lost at the decoder and the decoded video quality may suffer. By compensating such a quality loss with image refinement, we may obtain the same quality at a reduced bit rate, thus improving the video compression efficiency.

To obtain good video compression efficiency, we develop a strategy to determine how many non-zero coefficients should be kept in a block through data training. In particular, we estimate how the number of remaining non-zero coefficients, denoted as $n_c$, is related to image features of a block.

In one embodiment, we consider the quantization parameter (QP) and the variance of the block ($\sigma^2$) as the image features, and we derive a function f(.) to describe how QP and $\sigma^2$ are related to $n_c$. Mathematically, the relation can be described as $n_c = f(QP, \sigma^2)$.

To obtain the function f(.), the new collaborative coding mode, is integrated into an encoder. Each macroblock is encoded by both the existing method and the collaborative mode where coefficient thresholding and image refinement are implemented.

To gather sufficient statistical data for training, various video sequences are encoded at different QPs. For each combination of a video sequence and a QP, we also vary the number of remaining non-zero transform coefficients after truncation. In one example, the high frequency coefficients are set to zero for coefficient truncation and the remaining number of non-zero coefficients varies from 10 to 36 for an 8×8 block.

During the encoding process, the rate distortion cost of the existing H.264 method is calculated as $RDcost_0$ for a block, and the rate distortion cost of the collaborative mode is calculated as $RDcost(k)$ for the block, where k is the number of remaining non-zero coefficients after truncation. The difference between the two rate distortion costs is computed as $$\Delta RDcost(k) = RDcost(k) - RDcost_0.$$

The data set (QP, $\sigma^2$, k, $\Delta RDcost(k)$) for each encoding is recorded as an entry in a training data set. The data entries in the training set are clustered by the logarithm of the variance ($\log_{10}(\sigma^2)$). For each QP and each cluster of variance, the mean value of $\Delta RDcost(k)$ is computed, and the optimal k which leads to a minimum mean $\Delta RDcost(k)$ is stored as $n_c$ together with QP and $\sigma^2$. Consequently, we obtain many data sets for {QP, $\sigma^2$, $n_c$}. Using a curve fitting method, the relation between $n_c$ versus QP and $\sigma^2$ can be derived.

It is to be understood that the training data set and thus the derived relation are highly dependent on the video and coding parameters. In one exemplary setting, the video is compressed by an H.264 codec, only 8×8 transform is enabled, and bilateral filtering is employed for image refinement. The function for this exemplary setting is derived as:

$$n_c = 3.59 \log_{10} \sigma^2 - 0.86 QP + 43. \quad (1)$$

When other settings are used, for example, other video compression standards are used, or 4×4 transform instead of 8×8 transform is used, or other image refinement other than bilateral filtering is applied, the corresponding training data set should be built and a new function or new function parameters may be obtained.

In another embodiment, we may consider the QP, the number of non-zero coefficients ($\rho$), and the index ($I_{last}$) of the last non-zero coefficient in a scanning order (for example, a zigzag scanning order) as the image features when we derive the function f(.). That is, the relation may be described as $n_c = f(QP, \rho, I_{last})$. This embodiment is simpler since we need not to calculate the variance.

Figure 2:
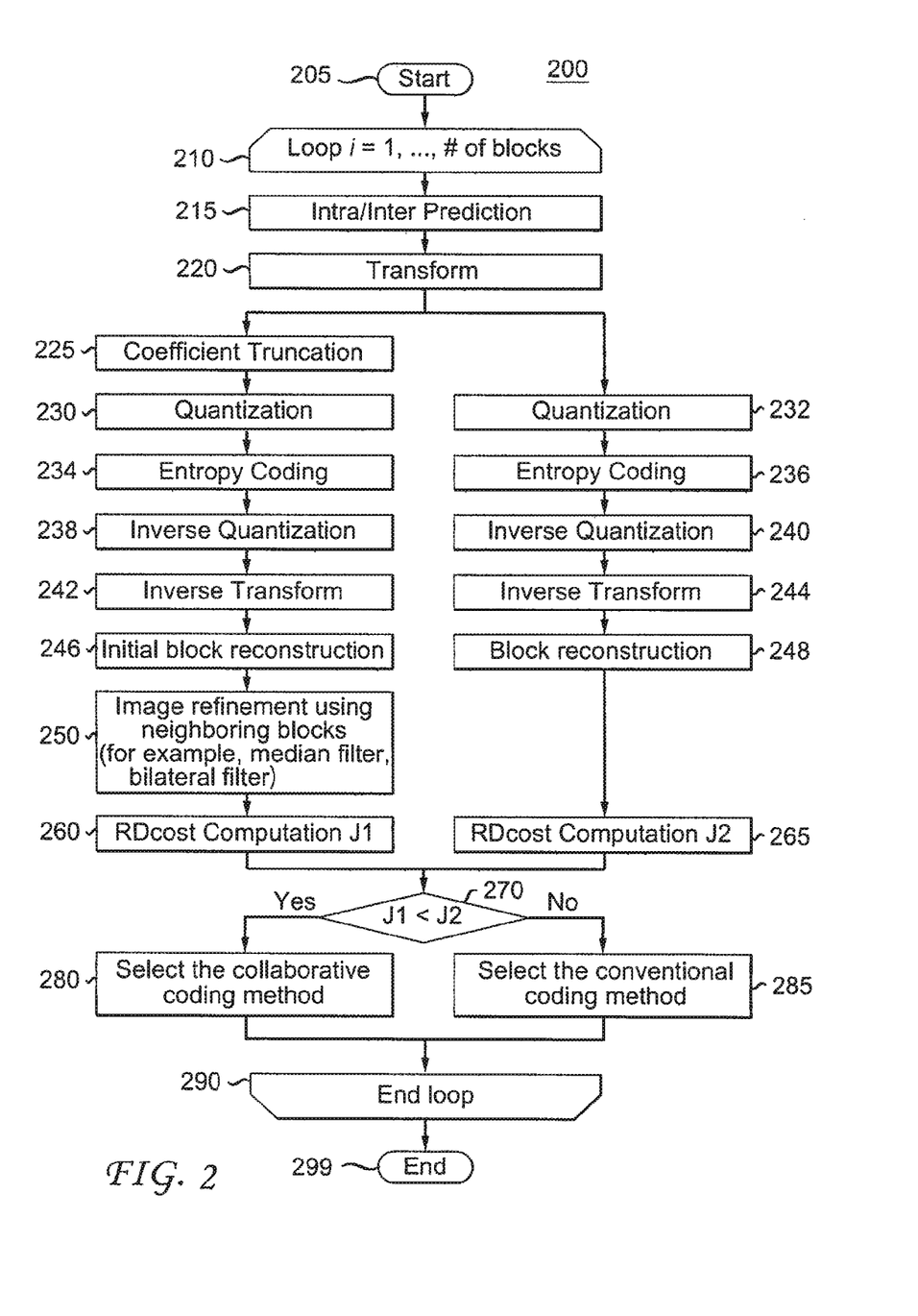
FIG. 2 is a flow diagram depicting an example of video encoding using coefficient thresholding and image refinement, in accordance with an embodiment of the present principles.

FIG. 2 illustrates an exemplary method 200 for video encoding using coefficient thresholding and image refinement. The new collaborative coding mode is included in method 200. An H.264 encoder is used to explain how the new coding mode can be integrated. However, the new mode can be included into encoders complying with other video coding standards.

Method 200 starts at step 205 that passes control to a loop limit step 210. At step 215, intra or inter prediction is performed for a block. The prediction residuals, i.e., the differences between the original image block and the predicted block, are transformed into transform coefficients at step 220. After the transform coefficients are generated, the encoding process may proceed in compliance with H.264 or proceed with the collaborative mode. The mode that is more efficient, for example with a lower rate distortion cost, will be selected to encode the block.

Compression and reconstruction of the image block in compliance with H.264 are performed at steps 232, 236, 240, 244, and 248. At step 232, the transform coefficients are quantized into quantized transform coefficients, which are entropy coded at step 236. Inverse quantization is performed at step 240 over the quantized transform coefficients to obtain de-quantized transform coefficients, which are inverse transformed at step 244 to obtain reconstructed prediction residuals. Using the reconstructed prediction residuals and a predicted block (from intra/inter prediction), the block is reconstructed at step 248. A rate distortion cost (J2) can then be computed at step 265.

On the other hand, compression and reconstruction of the block using the collaborative coding mode are performed at steps 225, 230, 234, 238, 242, 246, and 250. Before the quantization step (230), some non-zero transform coefficients are truncated. In one embodiment, the coefficients may be organized into a zigzag scanning order and the non-zero coefficients at the end of the scanning order may be set to zero. Exactly how many coefficients should be truncated may be calculated based on the quantization parameter, the block variance, the number of non-zero coefficients, or the index of the last non-zero coefficient as discussed before.

The truncated coefficients are then quantized at step 230 and entropy coded at step 234. After inverse quantization at step 238 and inverse transform at step 242, an initial block reconstruction is obtained at step 246. Note steps 230, 234, 238, 242, and 246 in the collaborative mode correspond to steps 232, 236, 240, 244, and 248 respectively. The initial reconstructed block is refined at step 250, for example using a bilateral filter as discussed in FIGS. 1A and 1B. The image refinement can perform iteratively. For example, when filtering is used for image refining, iterative filtering may be used (i.e., filtered pixels can be filtered again). When other image processing tools are used for image refining, the processed pixels may be processed again for iterative refinement. While the image refinement may use pixels from neighboring blocks, only the pixels of the current block are updated and pixels from the neighboring blocks remain unchanged. A rate distortion cost (J1) is then computed at step 260.

At step 270, it checks whether the collaborative coding mode has a smaller rate distortion cost, i.e., whether it is more efficient. If the collaborative mode is more efficient, the collaborative coding method is chosen at step 280. Otherwise, the coding method compliant with H.264 is selected at 285. The encoder signals explicitly or implicitly whether the collaborative mode is selected. If the collaborative mode is used, information regarding image refinement, for example the filter coefficients, should be signaled to or pre-determined at the decoder.

The reconstructed block can be used when encoding remaining blocks. For example, after block 140 is encoded using image refinement, the next block can use it for image refinement. After each block is encoded, the loop limit ends at step 290 and the process ends at step 299.

In method 200, both coefficient thresholding and image refinement are considered in the collaborative coding mode. In other embodiments, coefficient thresholding and image refinement may be applied separately. For example, coefficient thresholding (225) may be skipped in the encoder. In another example, image refinement (250) may be skipped.

Method 200 tests both the collaborative coding mode and H.264 coding mode to decide which coding mode to select. In other embodiments, the encoder may decide which coding mode to use without testing both modes based on, for example, the image property, coding conditions, and encoder speed requirement.

Figure 3:
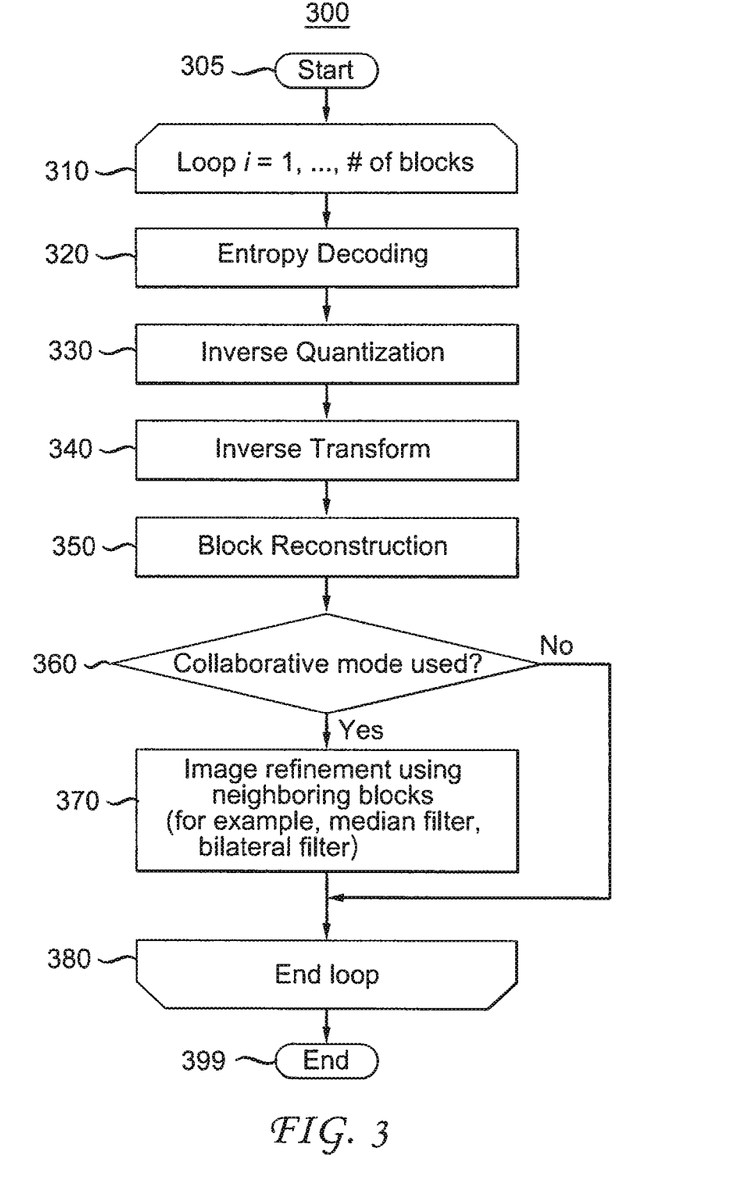
FIG. 3 is a flow diagram depicting an example of video decoding using image refinement, in accordance with an embodiment of the present principles.

FIG. 3 illustrates an exemplary method 300 for video decoding corresponding to encoding method 200. Method 300 starts at step 305 that passes control to a loop limit step 310. The compressed data are entropy decoded at step 320 to obtain transform coefficients and other coding information. The decoded transform coefficients are de-quantized at step 330 and inverse transformed to form prediction residuals at step 340. Using the prediction residuals and the predicted block from intra or inter prediction, the block is reconstructed at step 350. At step 360, it checks whether a collaborative mode is used. The encoder may signal whether the collaborative mode is selected implicitly or explicitly, and the decoder should derive this information correspondingly. If the collaborative mode is used, the reconstructed block is refined at step 370. Otherwise, the control is passed to step 380.

After each block is decoded, the loop limit ends at step 380 and the process ends at step 399. Note that the decoding process is generally the same as the reconstruction process within the encoder. For example, steps 330, 340, and 350 correspond to steps 240, 244, and 248 respectively, and the same image refinement should be used at the encoding (250) and decoding (370).

Figure 4:
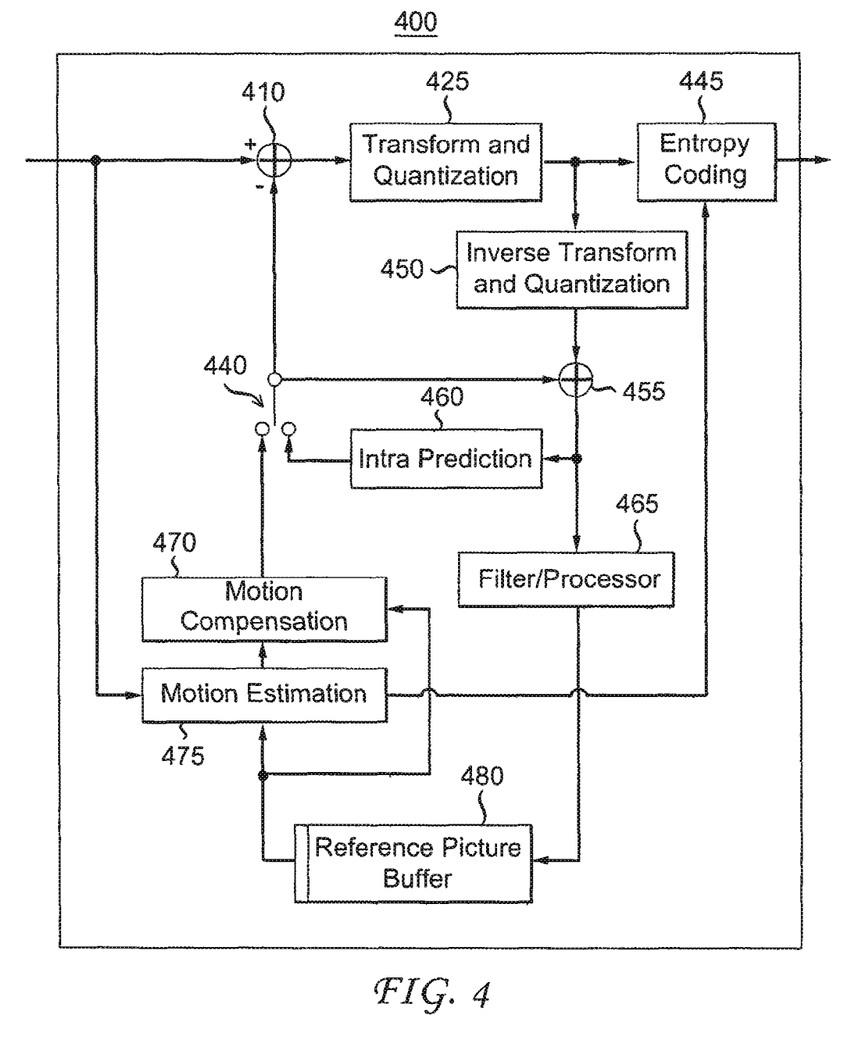
FIG. 4 is block diagram depicting an example of a video encoder, in accordance with an embodiment of the present principles.

FIG. 4 depicts a block diagram of an exemplary video encoder 400 that uses coefficient thresholding and/or image refinement described above. The input of apparatus 400 includes a video to be encoded.

In the exemplary encoder 400, a frame to be encoded is processed in units of macroblocks. Each macroblock is encoded using either an intra or inter mode. When a macroblock is encoded in an intra mode, it performs intra prediction in block 460. In an inter mode, the macroblock performs motion estimation (475) and compensation (470). The encoder decides which one of the intra mode or inter mode to use for encoding the macroblock (440), and prediction residuals are calculated by subtracting the predicted block from the original image block (410).

The prediction residuals are then transformed and quantized at block 425. The quantized transform coefficients, as well as motion vectors and other syntax elements, are entropy coded (445) to output a bitstream.

The encoder decodes an encoded block to provide a reference for further predictions. The quantized transform coefficients are de-quantized and inverse transformed to decode prediction residuals at block 450. Combining the decoded prediction residuals and the predicted block (455), an image block is reconstructed. A filter or an image processor is applied to the reconstructed block or the reconstructed picture (465), for example, to perform deblocking filtering to reduce blockiness artifacts. The filtered or processed image is stored at a reference picture buffer (480).

To integrate coefficient thresholding and/or image refinement into encoder 400, the transform and quantization module (425) would perform adaptive coefficient truncation as described in step 225, and the filter (465) may perform bilateral filtering for image refinement as described in step 250. Note the filter/processor (465) may perform image refinement after each image block is reconstructed rather than after the entire image is reconstructed. In addition, the filter/processor (465) may perform other filtering after the entire image is reconstructed, for example deblocking.

Figure 5:
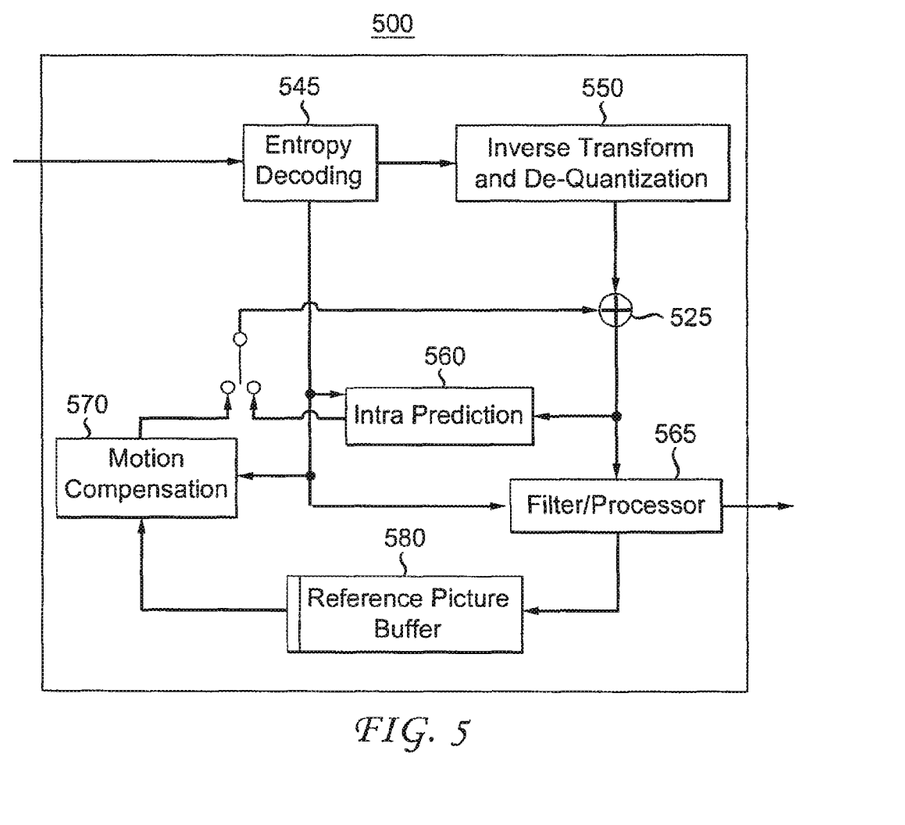
FIG. 5 is block diagram depicting an example of a video decoder, in accordance with an embodiment of the present principles.

FIG. 5 depicts a block diagram of an exemplary video decoder 500 utilizing the present principles. The input of apparatus 500 includes a video bitstream, which may be generated by video encoder 400.

The bitstream is first entropy decoded (545) to obtain transform coefficients, motion vectors, and other coded information. The transform coefficients are de-quantized and inverse transformed to decode the prediction residuals at block 550. Combining the decoded prediction residuals and the predicted block (525), an image block is reconstructed. The predicted block may be obtained from intra prediction (560) or motion-compensated prediction (570). A filter or a general image processor (565) is applied to the reconstructed block or the reconstructed image. The filtered or processed image is stored at a reference picture buffer (580).

Similar to the encoder, to integrate image refinement into decoder 400, the filter/processor (565) may perform bilateral filtering or other image processing techniques for image refinement as described in step 370. Note that coefficient truncation is not performed at the decoder.

Figure 6:
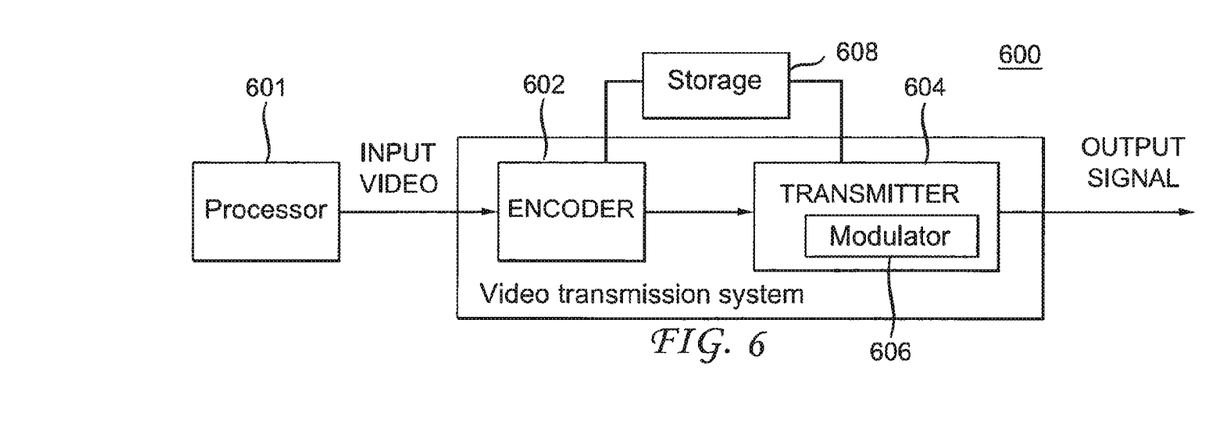
FIG. 6 is a block diagram depicting an example of an image processing system that may be used with one or more implementations.

Referring now to FIG. 6, a data transmission system or apparatus 600 is shown, to which the features and principles described above may be applied. The data transmission system or apparatus 600 may be, for example, a head-end or transmission system for transmitting a signal using any of a variety of media, such as, for example, satellite, cable, telephone-line, or terrestrial broadcast. The data transmission system or apparatus 600 also, or alternatively, may be used, for example, to provide a signal for storage. The transmission may be provided over the Internet or some other network. The data transmission system or apparatus 600 is capable of generating and delivering, for example, video content and other contents.

The data transmission system or apparatus 600 receives processed data and other information from a processor 601. In one implementation, the processor 601 trains a set of video sequences to obtain the relation between the number of remaining non-zero coefficients and image features. The processor 601 may also provide metadata to 600 indicating, for example, how the pixels from neighboring blocks are used for image refinement and the bilateral filter coefficients.

The data transmission system or apparatus 600 includes an encoder 602 and a transmitter 604 capable of transmitting the encoded signal. The encoder 602 receives data information from the processor 601. The encoder 602 generates an encoded signal(s). The encoder 602 may perform coefficient thresholding and image refinement.

The encoder 602 may include sub-modules, including for example an assembly unit for receiving and assembling various pieces of information into a structured format for storage or transmission. The various pieces of information may include, for example, coded or uncoded video, and coded or uncoded elements such as, for example, a flag indicating whether a collaborative coding mode is used, and other syntax elements. In some implementations, the encoder 602 includes the processor 601 and therefore performs the operations of the processor 601.

The transmitter 604 receives the encoded signal(s) from the encoder 602 and transmits the encoded signal(s) in one or more output signals. The transmitter 604 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 606. The transmitter 604 may include, or interface with, an antenna (not shown). Further, implementations of the transmitter 604 may be limited to the modulator 606.

The data transmission system or apparatus 600 is also communicatively coupled to a storage unit 608. In one implementation, the storage unit 608 is coupled to the encoder 602, and stores an encoded bitstream from the encoder 602. In another implementation, the storage unit 608 is coupled to the transmitter 604, and stores a bitstream from the transmitter 604. The bitstream from the transmitter 604 may include, for example, one or more encoded bitstreams that have been further processed by the transmitter 604. The storage unit 608 is, in different implementations, one or more of a standard DVD, a Blu-Ray disc, a hard drive, or some other storage device.

Figure 7:
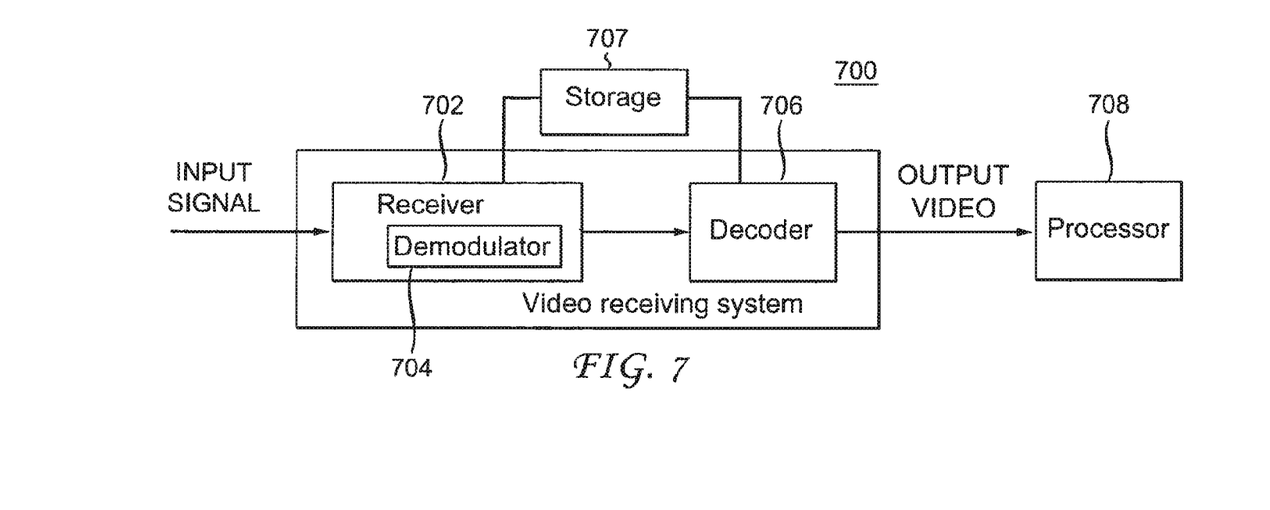
FIG. 7 is a block diagram depicting another example of an image processing system that may be used with one or more implementations.

Referring now to FIG. 7, a data receiving system or apparatus 700 is shown to which the features and principles described above may be applied. The data receiving system or apparatus 700 may be configured to receive signals over a variety of media, such as, for example, storage device, satellite, cable, telephone-line, or terrestrial broadcast. The signals may be received over the Internet or some other network.

The data receiving system or apparatus 700 may be, for example, a cell-phone, a computer, a set-top box, a television, or other device that receives encoded video and provides, for example, decoded video signal for display (display to a user, for example), for processing, or for storage. Thus, the data receiving system or apparatus 700 may provide its output to, for example, a screen of a television, a computer monitor, a computer (for storage, processing, or display), or some other storage, processing, or display device.

The data receiving system or apparatus 700 includes a receiver 702 for receiving an encoded signal, such as, for example, the signals described in the implementations of this application. The receiver 702 may receive, for example, a signal output from the data transmission system 600 of FIG. 6.

The receiver 702 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 704, de-randomizing the energy in the signal, de-interleaving the data in the signal, and error-correction decoding the signal. The receiver 702 may include, or interface with, an antenna (not shown). Implementations of the receiver 702 may be limited to the demodulator 704.

The data receiving system or apparatus 700 includes a decoder 706. The receiver 702 provides a received signal to the decoder 706. The signal provided to the decoder 706 by the receiver 702 may include one or more encoded bitstreams. The decoder 706 outputs a decoded signal, such as, for example, decoded video signals including video information. The decoder 706 may be, for example, decoder 500 described in FIG. 5.

The data receiving system or apparatus 700 is also communicatively coupled to a storage unit 707. In one implementation, the storage unit 707 is coupled to the receiver 702, and the receiver 702 accesses a bitstream from the storage unit 707. In another implementation, the storage unit 707 is coupled to the decoder 706, and the decoder 706 accesses a bitstream from the storage unit 707. The bitstream accessed from the storage unit 707 includes, in different implementations, one or more encoded bitstreams. The storage unit 707 is, in different implementations, one or more of a standard DVD, a Blu-Ray disc, a hard drive, or some other storage device.

The output data from the decoder 706 is provided, in one implementation, to a processor 708. In some implementations, the decoder 706 includes the processor 708 and therefore performs the operations of the processor 708. In other implementations, the processor 708 is part of a downstream device such as, for example, a set-top box or a television.

We thus provide one or more implementations having particular features and aspects. In particular, we provide several implementations relating to video encoding and decoding using image refinement, which may be used to improve video compression efficiency. However, variations of these implementations and additional applications are contemplated and within our disclosure, and features and aspects of described implementations may be adapted for other implementations.

Several of the implementations and features described in this application may be used in the context of the MPEG HEVC Standard and its extensions. Additionally, these implementations and features may be used in the context of another standard (existing or future), or in a context that does not involve a standard.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in one or more of an encoder (for example, the encoder 602), a decoder (for example, the decoder 706), a post-processor (for example, the processor 708) processing output from a decoder, or a pre-processor (for example, the processor 601) providing input to an encoder. Further, other implementations are contemplated by this disclosure.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with video encoding, video decoding, and other processing of video data. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, a game console, and other communication devices. As should be clear, the equipment may be mobile and even installed in a mobile vehicle.

Additionally, the methods may be implemented by instructions being performed by a processor, and such instructions (and/or data values produced by an to implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method, comprising:
   inverse quantizing transform coefficients of a block in an image to form de-quantized transform coefficients;
   inverse transforming the de-quantized transform coefficients to form prediction residuals;
   forming a reconstructed image block using the prediction residuals;
   filtering, using at least one filter, a set of pixels to form filtered pixels, the set of pixels comprising a plurality of pixels of the reconstructed image block and a plurality of pixels of reconstructed blocks adjacent to the block,
   wherein the filtered pixels comprising a first subset of filtered pixels, which are filtered results for pixel locations corresponding to the plurality of pixels of the reconstructed image block and a second subset of filtered pixels, which are filtered results for pixel locations corresponding to the plurality of pixels of the reconstructed blocks adjacent to the block; and
   replacing the plurality of pixels of the reconstructed image block with the first subset of filtered pixels to form a refined image block, wherein the refined image block is used to encode or decode another block of the image, and wherein the plurality of pixels of the reconstructed blocks adjacent to the block are not replaced by the second subset of filtered pixels.

2. The method of claim 1, wherein the reconstructed blocks adjacent to the block are encoded or decoded before the block.

3. The method of claim 1, wherein the reconstructed image block forms an extended image block, together with pixels that form part of the reconstructed blocks adjacent to the reconstructed image block, and wherein the filtering is performed on the extended image block.

4. The method of claim 1, wherein the filtering is performed by a bilateral filter.

5. The method of claim 4, wherein a space parameter and a range parameter of the bilateral filter vary with a quantization parameter.

6. The method of claim 1, wherein the method is a method of encoding, further comprising:
   setting one or more of initial transform coefficients to zero;
   quantizing the initial transform coefficients to the transform coefficients, wherein the transform coefficients are to be inverse quantized.

7. The method of claim 6, wherein the number of remaining non-zero initial transform coefficients after the one or more of the initial transform coefficient are set to zero varies with at least one of a quantization parameter, a variance of the block, the number of non-zero initial coefficients of the block, and an index of the last non-zero initial coefficient in a scanning order.

8. An apparatus, comprising at least a memory and one or more processors, the one or more processors configured to:
   inverse quantize transform coefficients of a block in an image to de-quantized transform coefficients;

inverse transform the de-quantized transform coefficients to prediction residuals;

form a reconstructed image block using the prediction residuals; and filter a set of pixels to form filtered pixels, the set of pixels comprising a plurality of pixels of the reconstructed image block and a plurality of pixels of reconstructed blocks adjacent to the block, wherein the filtered pixels comprising a first subset of filtered pixels, which are filtered results for pixel locations corresponding to the plurality of pixels of the reconstructed image block and a second subset of filtered pixels, which are filtered results for pixel locations corresponding to the plurality of pixels of the reconstructed blocks adjacent to the block, and replace the plurality of pixels of the reconstructed image block with the first subset of filtered pixels to form a refined image block, wherein the refined image block is used to encode or decode another block of the image, and wherein the plurality of pixels of the reconstructed blocks adjacent to the block are not replaced by the second subset of filtered pixels.

9. The apparatus of claim 8, wherein the reconstructed blocks adjacent to the block are encoded or decoded before the block.

10. The apparatus of claim 8, wherein the reconstructed image block forms an extended image block, together with pixels that form part of the reconstructed blocks adjacent to the reconstructed image block, and wherein the one or more processors are configured to perform filtering on the extended image block.

11. The apparatus of claim 8, wherein a bilateral filter is used for filtering.

12. The apparatus of claim 11, wherein the bilateral filter varies a space and a range parameter with a quantization parameter.

13. The apparatus of claim 8, wherein the apparatus is an encoder and wherein one or more of initial transform coefficients are set to zero before being quantized into the transform coefficients, the transform coefficients then being inverse quantized, and wherein the number of remaining non-zero initial transform coefficients after the one or more of the initial transform coefficient are set to zero varies with at least one of a quantization parameter, a variance of the block, the number of non-zero initial coefficients of the block, and an index of the last non-zero initial coefficient in a scanning order.

14. A non-transitory processor readable medium having stored thereupon instructions for causing one or more processors to collectively perform:

inverse quantizing transform coefficients of a block in an image to form de-quantized transform coefficients;

inverse transforming the de-quantized transform coefficients to form prediction residuals;

forming a reconstructed image block using the prediction residuals;

filtering a set of pixels to form filtered pixels, the set of pixels comprising a plurality of pixels of the reconstructed image block and a plurality of pixels of reconstructed blocks adjacent to the block, wherein the filtered pixels comprising a first subset of filtered pixels, which are filtered results for pixel locations corresponding to the plurality of pixels of the reconstructed image block and a second subset of filtered pixels, which are filtered results for pixel locations corresponding to the plurality of pixels of the reconstructed blocks adjacent to the block; and replacing the plurality of pixels of the reconstructed image block with the first subset of filtered pixels to form a refined image block, wherein the refined image block is used to encode or decode another block of the image, and wherein the plurality of pixels of the reconstructed blocks adjacent to the block are not replaced by the second subset of filtered pixels.

* * * * *